July 14, 1931.  E. C. SMITH  1,814,609
LINE OR CABLE CONNECTER
Filed May 29, 1930
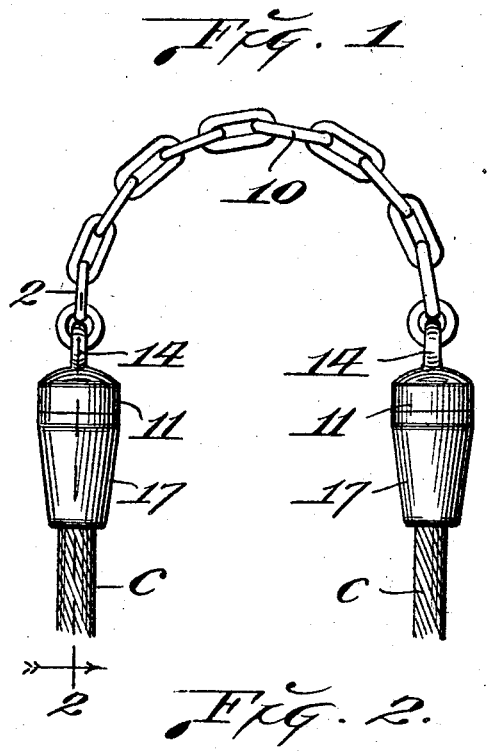
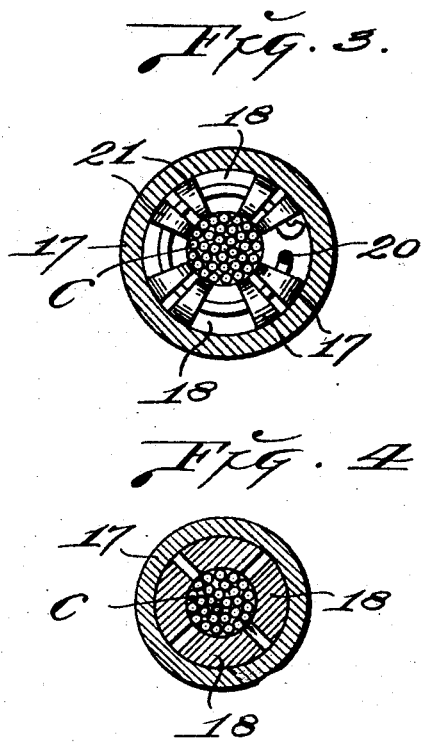
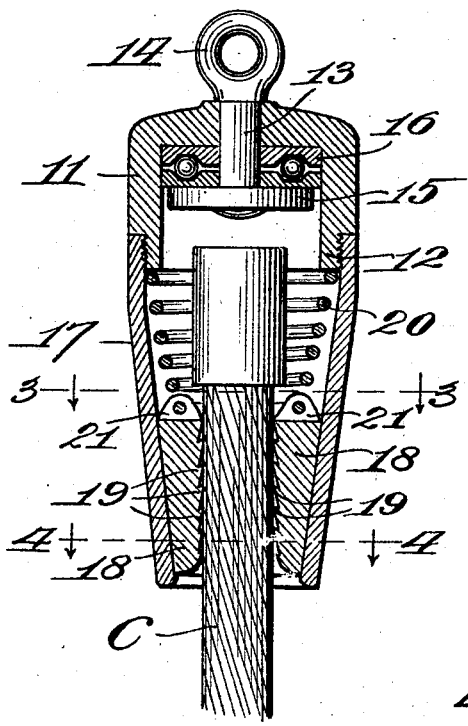
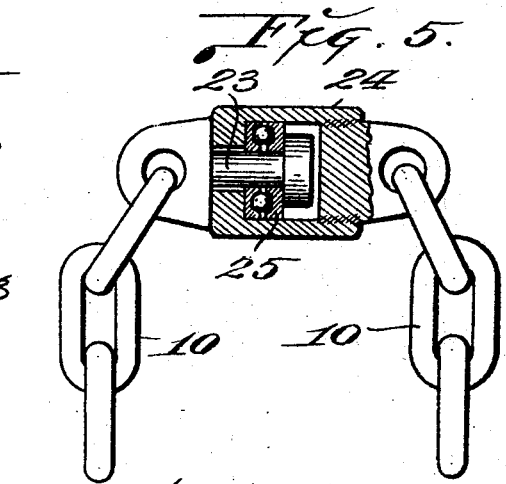
INVENTOR
ERNEST C. SMITH.
BY Martin C. Smith, ATTY.

Patented July 14, 1931

1,814,609

UNITED STATES PATENT OFFICE

ERNEST C. SMITH, OF VENTURA, CALIFORNIA

LINE OR CABLE CONNECTER

Application filed May 29, 1930. Serial No. 456,879.

My invention relates to a line or cable connecter that is especially designed for use in connecting the end of a new line or cable to the end of an old line or cable for the purpose of drawing the new line or cable through the crown and travelling blocks of an oil well derrick and the principal object of my invention is, to provide a connecter of the character referred to that is relatively simple in construction and which will readily permit relative swivelling or rotation between the connected lines or cables.

Further objects of my invention are, to provide a connecter that is strong and durable in construction, flexible throughout its length, capable of being easily and quickly applied to the ends of lines or cables and further, to provide a connecter that will readily pass around the sheaves that are utilized in the standard forms of crown and travelling blocks.

With the foregoing and other objects in view, my invention consists in certain novel features of construction and arrangement of parts that will hereinafter be more fully described and claimed and illustrated in the accompanying drawings, in which:

Fig. 1 is a side elevational view of a connecter constructed in accordance with my invention.

Fig. 2 is an enlarged vertical section taken on the line 2—2 of Fig. 1.

Fig. 3 is a horizontal section taken on the line 3—3 of Fig. 2.

Fig. 4 is a horizontal section taken on the line 4—4 of Fig. 2.

Fig. 5 is an elevational view partly in section of a portion of the chain that forms a part of the connecter and showing a swivel in said chain.

My improved connecter as illustrated comprises a pair of clamping members that are secured to the ends of a short section of chain 10 and as the construction of the clamping members is identical but one will be described. Each clamp comprises a short hollow cylindrical head 11 provided at one end with an externally threaded flange 12.

Extending axially through the top of the head and arranged for rotation therein is a pin 13 on the outer end of which is formed a ring 14 that is secured to the end of the chain 10.

Secured on the inner end of pin 13 within head 11 is a disc 15 and arranged between this disc and the top of the head is an antifriction bearing 16.

The construction just described provides a swivel connection between the end of the chain and the head 11.

The larger end of a tapered sleeve 17 is internally threaded for engagement with the externally threaded flange 12 and loosely arranged within the tapered portion of this sleeve is a plurality of segmental slips 18 provided on their inner faces with teeth 19 that are adapted to engage the end of the line or cable C that is inserted in the clamp.

Arranged between the inner ends of the slips 18 and the shoulder at the end of flange 12 is an expansive coil spring 20 which exerts pressure against the slips tending to move the same outwardly through the tapered sleeve and into engagement with the inserted line or cable.

In order to facilitate the assembly of the parts of the clamp the head ends of the slips 18 may be secured to the end of spring 20 in any suitable manner, for instance, as shown in Figs. 2 and 3, the outer coil of the spring is threaded through apertures that are formed in lugs 21 on the inner ends of the slips or the outer coil may be brazed directly to said slips.

Such construction connects the slips and spring so that the same may be inserted as one piece in the tapered sleeve 17.

To connect the ends of two lines or cables the clamps after being properly assembled are firmly held in the hand and pressed onto the ends of the lines so that the latter pass between the slips 18 and during such operation said slips will move inwardly against the resistance offered by the springs 20.

As the ends of the lines or cables are inserted in the sleeves springs 20 will act to move slips 18 outwardly so that the teeth on the inner faces of said slips will engage the inserted end of the line or cable and the pull of the latter will tend to more fully engage the slips with the surface of the cables and thereby securely retain the clamp upon the cable.

The clamps are substantially cylindrical in form and are comparatively short with the result that said clamps and the chain connecting the same will readily pass around the sheaves of the crown and traveling blocks and the swivel connection between the ends of the chain and the clamps enables one line or cable to twist or rotate relative to the other.

In some instances it may be found desirable to arrange in the intermediate portion of the chain 10 a swivel of the type illustrated in Fig. 5 and which includes a headed pin 22 that is arranged for rotation within a housing 24 and where such construction is employed I prefer to use an anti-friction bearing such as 25 between the head of the pin and the end of the housing, thereby minimizing friction within the swivel while the same is in action.

It will be noted that in my improved line connecter the members 11 and 17 constitute a housing that is closed at one end and within which the end of the line or cable is clamped and as a result there are no projecting ends of the connected lines or cables to interfere with the free operation of the connecter while passing over sheaves or pulleys.

Thus it will be seen that I have provided a connecter for lines or cables and which connecter is relatively simple in construction, inexpensive of manufacture, capable of being easily and quickly applied to or removed from the ends of the lines or cables and which connecter is applicable for use in connection with lines or cables forming a part of well drilling rigs in mines, in log handling rigs or in fact any place where hoisting or hauling lines or cables are employed.

It will be understood that minor changes in the size, form and construction of the various parts of my improved line or cable connecter may be made and substituted for those herein shown and described without departing from the spirit of my invention, the scope of which is set forth in the appended claims.

I claim as my invention:

1. In a line or cable connecter, a hollow member provided with a tapered portion, a plurality of spring pressed slips arranged within the tapered portion of said hollow member, a pin mounted for rotation in the end of said hollow member and an antifriction bearing arranged between said pin and hollow member.

2. In a line or cable connecter, a hollow body formed in two parts that are detachably connected, one of said parts being tapered, a plurality of spring pressed slips arranged in the tapered portion of said hollow member and a pin swiveled in the other part of said hollow member.

3. In a line or cable connecter, a hollow body formed in two parts that are detachably connected, one of said parts being tapered, a plurality of spring pressed slips arranged in the tapered portion of said hollow member, a pin swiveled in the other part of said hollow member and an antifriction bearing between said pin and hollow body member.

4. In a line or cable connecter, a pair of hollow bodies having tapered portions, spring pressed slips arranged within the tapered portions of said hollow bodies, a chain and swiveled connections between the ends of said chain and the ends of said hollow bodies.

5. In a line or cable connecter, a hollow body having a tapered portion, a plurality of slips arranged in the tapered portion of said hollow body perforated lugs on the inner ends of said slips and an expansive coil spring arranged within the hollow body, one end of which spring is threaded through said perforated lugs.

6. In a line or cable connecter, a housing closed at one end, means on the interior of said housing for clamping the inserted portion of a line or cable and a member swiveled in and passing through the closed end of said housing.

7. In a line or cable connected, a hollow cylindrical member closed at one end and composed of a pair of detachably connected members, means within said hollow cylindrical member for clamping the inserted end of a line or cable and a member swiveled in the closed end and passing through the closed end of said hollow cylindrical member.

In testimony whereof I affix my signature.

ERNEST C. SMITH.